July 31, 1945.   R. P. MEANS, JR   2,380,662
BALL BEARING SCREW AND NUT GEAR
Filed June 25, 1943

Inventor
Ralph P. Means, Jr.
By Blackmore, Spencer & Flint
Attorneys

Patented July 31, 1945

2,380,662

UNITED STATES PATENT OFFICE 2,380,662

BALL BEARING SCREW AND NUT GEAR

Ralph P. Means, Jr., Saginaw, Mich., assignor to General Motors Corporation, Detroit, Mich., a corporation of Delaware Application June 25, 1943, Serial No. 492,220

5 Claims. (Cl. 74—459)

This invention relates to a ball bearing screw and nut gear in which a helical groove in said screw and an internal helical groove in said nut correspond to form a helical passage containing balls which constitute a ball thread between said screw and nut, and especially a screw and nut gear in which the balls are recirculated through the helical passage by means of one or more transfer return tubes uniting paths in the nut by which the balls enter and leave the helical passage.

When two such paths are united by a transfer return tube they commonly extend to the same side of the nut in parallel tangential planes so that a transfer return tube with parallel end portions which may be simultaneously inserted in drilled holes providing the aforesaid paths may be used, as shown, for instance, in U. S. Patent No. 2,267,524.

In the disclosure of the foregoing patent, and as ordinarily constructed, each path by which the balls enter or leave the helical passage is at one and the same time in a plane tangential to the helical passage and in a plane normal to the axis of said screw, from which it necessarily follows that it is normal to a plane containing the axis of said screw.

It is, of course, desirable that the said paths and their connecting transfer return tube be smooth, with only a minimum clearance over the diameter of the balls, to prevent the balls from crowding and jamming together, and to closely confine and guide them as directly as possible from one point to another of the helical passage with a minimum of frictional resistance to their transit. These considerations are of increasing importance, the higher the operating speed of the ball bearing screw and nut gear.

It has been found that in a construction as thus far described, with a path by which the balls enter or leave the helical passage normal to a plane containing the axis of said screw, one edge of the thread groove on the screw encroaches into said path and interferes with the otherwise available diameter of said path by which the balls enter or leave the helical passage, causing a restriction which is evident as a tight spot. This difficulty can be, and has been, overcome by increasing the diameter of the path, at least from the helical passage end thereof to a point beyond the otherwise tight spot, but such an expedient is only satisfactory in a gear operating at a very low speed. At higher operating speeds there is crowding and jamming of the balls due to the fact that they are not sufficiently closely confined and positively guided in that part of the path of increased diameter.

The object of the invention is a ball bearing screw and nut gear capable of operating successfully at higher speeds.

A more specific object of the invention is a ball bearing screw and nut gear in which the above described "interference" is avoided without increasing the diameter of the path or paths by which the balls enter or leave the helical passage.

The above and other objects of the invention will be apparent as the description proceeds.

According to the invention, each path by which the balls enter or leave the helical passage is inclined at the helical angle of the helical passage in a plane tangential thereto, for some distance outwards from said helical passage.

The drawing shows the application of the invention to a ball bearing screw and nut gear with two trains of balls.

Figure 1:
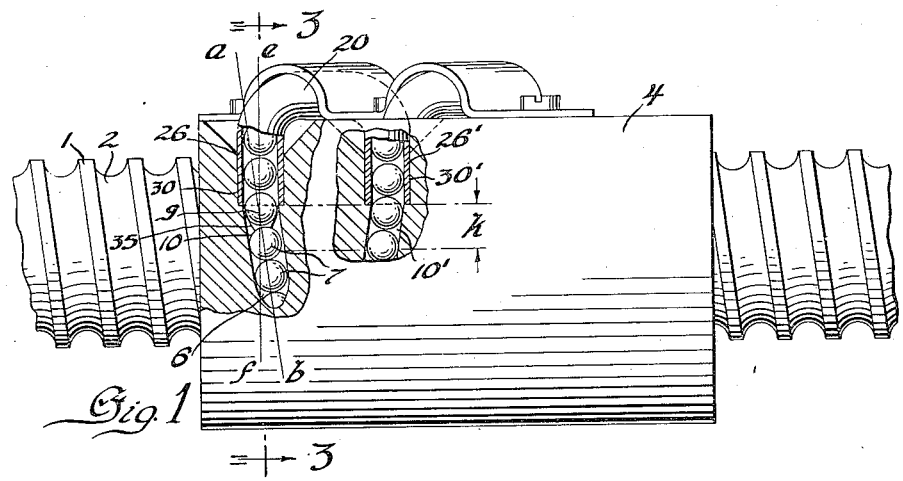
Figure 1 is a view of the screw and nut gear in elevation with part broken away, and in section.
Figure 2:
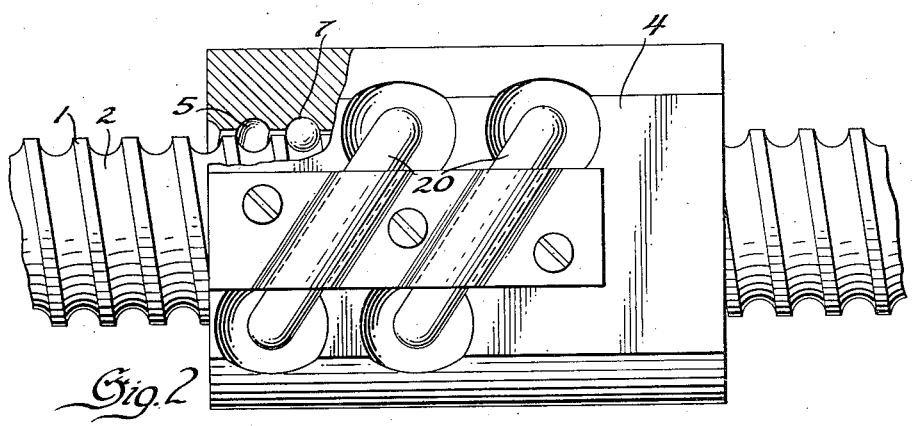
Figure 2 is a plan view with part broken away, and in section.

The screw 1 is provided with a helical groove 2.

The nut 4 is provided with a helical groove 5 corresponding with the helical groove 2 on the screw 1 to form a helical passage 6 containing balls 7 which constitute a ball thread between said screw and nut. There are two separate and distinct trains of balls respectively provided with transfer return tubes with parallel end portions as shown in U. S. Patent No. 2,267,524.

Figure 3:
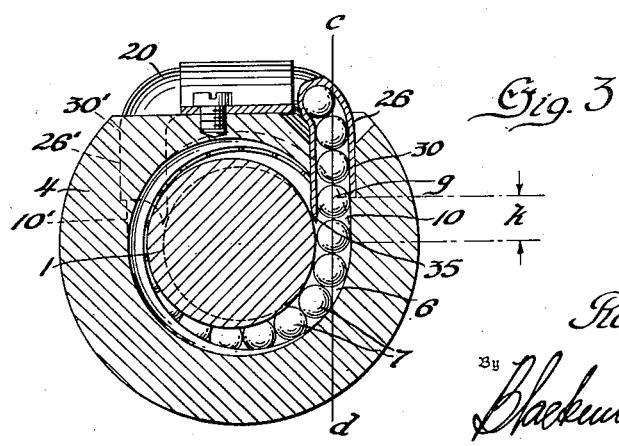
Figure 3 is a sectional view on line 3—3 of Figure 1.

However, according to the present invention, and as shown in Figures 1 and 3, the paths by which the balls enter or leave the helical passage 6 are provided by holes such as 10, which are bored with their axes a—b (Figure 1) inclined at the helical angle of the helical passage in a plane tangential thereto such as c—d (Figure 3), each said hole such as 10 forming a straight continuation of the helical passage in a plane such as c—d.

Two such inclined paths 10, 10' respectively extending towards one side of the nut from spaced points of the helical passage at opposite sides of the screw will, of course, be oppositely inclined as seen in Figure 1. In order that two such inclined paths 10, 10' may be united by a U-shaped transfer return tube such as 20 with parallel end portions such as 26, 26' the inclined paths 10, 10' join continuations thereof provided by holes 30 and 30' respectively, each of which is bored with its axis such as $e-f$ in a tangential plane such as $c-d$ and in a plane normal to the axis of the screw 1, to provide parallel sockets into which the parallel ends 26, 26' of the U-shaped transfer tube may be simultaneously inserted, the axes of the holes such as 10 and 30 intersecting at a point $g$ some distance outwards from said helical passage, where the path through the bore of the end of the tube 20 will be sufficiently offset to preclude any interfering encroachment into said path of that edge of the thread groove on the screw which would otherwise cause a restriction.

In the example illustrated, the point of intersection $g$ of the axes of the holes such as 10 and 30 is at a distance $k$ outwards from said helical passage equal to not less than 20% nor more than 50% of the ball circle radius of the helical passage.

Each of the ends such as 26, 26' of each U-shaped transfer tube 20 is provided with a finger portion such as 35, which extends into the path of the balls to guide them from the helical passage into inclined path 10 or 10' and the transfer return tube.

It will be noted that a structure has been provided in which U-shaped transfer return tubes with parallel end portions may be used and in which the balls are sufficiently closely confined that they cannot crowd and jam as they are positively guided out of the helical passage in a direction which precludes any interference by the thread of the screw.

A ball bearing screw and nut gear according to the invention will operate successfully at speeds in excess of 500 R. P. M.

I claim:
1. In a screw and nut gear, a screw having a helical thread, a nut surrounding said screw and having a cooperating helical thread, said screw and nut threads forming a helical path, balls in said path, a transfer tube forming a supplemental path, said transfer tube having rectilinear arms tangent to the screw and extending in planes normal to the axis of said screw, said nut having rectilinear passages therein angularly related to the axis of the screw and to said arms and connecting the spiral path formed by the cooperating helical threads with the rectilinear arms of the transfer tube.

2. The invention defined by claim 1, said transfer tube arms having fingers projecting into the rectilinear passages.

3. The invention defined by claim 1, the angular relation of the rectilinear passages corresponding to that of the helical path and the rectilinear passages being tangent to said path.

4. The invention defined by claim 1, the length of the rectilinear passages being at least 20% of the ball circle radius.

5. In a screw and nut gear, a screw having a helical thread, a nut surrounding said screw and having a cooperating helical thread, said screw and nut threads forming a helical path, balls in said path, a transfer tube forming a supplemental path, said transfer tube having parallel arms, said nut having rectilinear passages connecting said helical path to the ends of said arms to complete a closed circuit for said balls, said passages having axes located to facilitate the movement of the balls between the helical path and the transfer tube.

RALPH P. MEANS, Jr.